US005757974A

United States Patent [19]

Impagliazzo et al.

[11] Patent Number: 5,757,974

[45] Date of Patent: May 26, 1998

[54] SYSTEM AND METHOD FOR DATA COMPRESSION

[75] Inventors: John M. Impagliazzo, Wakefield, R.I.; Walter E. Greene, Mansfield; Quyen Q. Huynh, Fall River, both of Mass.

[73] Assignee: The United States of America as represented by the Secretary of the Navy, Washington, D.C.

[21] Appl. No.: 641,018

[22] Filed: Apr. 15, 1996

[51] Int. Cl.[6] .................................................. H04N 7/30

[52] U.S. Cl. .................................................. 382/248; 382/277

[58] Field of Search .................................................. 382/248, 239, 382/276, 277, 280, 250, 232; 348/395, 403

[56] References Cited

U.S. PATENT DOCUMENTS

| | | | |
|---|---|---|---|
| 5,315,670 | 5/1994 | Shapiro | 382/240 |
| 5,321,776 | 6/1994 | Shapiro | 382/240 |
| 5,412,741 | 5/1995 | Shapiro | 382/232 |
| 5,453,945 | 9/1995 | Tucker et al. | 382/251 |
| 5,497,777 | 3/1996 | Abdel Malek et al. | 128/660 |
| 5,513,273 | 4/1996 | Ito | 382/248 |
| 5,563,960 | 10/1996 | Shapiro | 382/248 |

OTHER PUBLICATIONS

H. Cha, L.F. Chaparro, Systems, Man and Cybernetics, 1993 Int. Conf., IEEE pp. 501–506.

*Primary Examiner*—Joseph Mancuso
*Assistant Examiner*—Samir Ahmed
*Attorney, Agent, or Firm*—Michael J. McGowan; William F. Eipert; Prithvi C. Lall

[57] ABSTRACT

A data compression system includes an image preprocessor for generating a digitized, formatted set of pixels which is passed to an image transformer. The image transformer generates a set of wavelet coefficients from the formatted set of pixels via a series of one-dimensional wavelet transforms. A compression processor selects a subset of the wavelet coefficients for retention based on areas of interest in the original image and the position of coefficients within the set of coefficients. The compression processor then builds a compressed image file using a coefficient location identifier to reduce the size of the addresses that indicate the position of the selected coefficients within the set.

15 Claims, 4 Drawing Sheets

SYSTEM AND METHOD FOR DATA COMPRESSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates in general to data compression techniques and, more particularly, to a system and method for wavelet-based data compression for digital transmission or storage of images or signals.

(2) Description of the Prior Art

Data compression systems are essential to meet the digital storage and transmission demands of these current and evolving image and signal processing applications. Current image compression techniques such as the standard Joint Photographic Expert Group (JPEG) techniques are unable to meet the increasing demands for higher compression ratios and greater image fidelity needed by many applications.

The JPEG technique is based on the discrete cosine transform. The technique divides the image into a series of 8×8 pixel blocks and the discrete cosine transform is computed for each block producing an average value and 63 frequency values. These values can be quantized to produce a minimum set representing each 8×8 block. Since at least one value is needed for each block, the highest compression ratio achievable is 64. Additionally, because the image is divided into 8×8 blocks, the approach tends to mask details, interrupt continuous lines and cause discontinuities at the boarders thereby lowering image fidelity in the reconstructed image.

Approaches designed to increase the compression ratio and increase image fidelity have focused on using wavelet based applications. It is known that wavelet based applications can be used to efficiently compress images as well as improve noisy images. For example, U.S. Pat. Nos. 5,315,670, 5,321,776 and 5,412,741 to Shapiro describe a technique of compressing an image by coding the addresses of the threshold crossings of a significance map. This technique, described as the zerotree structure, uses a symbol to identify root coefficients as those coefficients having no descendant coefficients with a magnitude greater than a given level. U.S. Pat. No. 5,453,945 to Tucker et al. describes a technique of employing an adaptive wavelet transform to generate a set of wavelet coefficients having a lowest bit measure.

However, wavelet based techniques often suffer from many disadvantages as well. For example, the technique of the Shapiro patents is computationally intensive and complex to implement. The technique of Tucker at al. requires a time-consuming and computationally complex set of steps to determine the wavelet basis or wavelet packet which provides the greatest degree of compression for a particular signal. For a 512×512 image, this technique could require 1024 bases, a different basis for each row and column. Tracking the bases increases the amount of data required in the compressed image.

Still other applications require such a large amount of data to describe and code the addresses of the selected coefficients that the compression benefits of the wavelet transforms are lost.

Thus, what is needed is an image compression system which can reliably and efficiently generate a compressed image having a high compression ratio and maintaining image fidelity.

SUMMARY OF THE INVENTION

Accordingly, it is a general purpose and object of the present invention to provide an improved image compression system and method.

A further object of the present invention is the provision of a wavelet based image compression system which is less computationally complex than prior image compression systems.

It is another object of the present invention to provide a wavelet based image compression system having a simple and efficient method of selecting coefficients for retention.

Yet a further object of the present invention to provide a wavelet based image compression system which is computationally efficient and requires less data to describe the addresses of the selected coefficients.

These and other objects made apparent hereinafter are accomplished with the present invention by providing an image preprocessor for generating a digitized, formatted set of pixels. An image transformer operates on the formatted set of pixels to generate matrix of wavelet coefficients via a series of one-dimensional wavelet transforms. A compression processor selects coefficients for retention based on areas of interest in the original image and the position of coefficients within the coefficient matrix. The selection criteria can be varied for each image thereby allowing for retaining greater image fidelity in the compressed image. The processor also builds a compressed image file that uses a coefficient location identifier (CLI) to reduce the size of the addresses needed to indicate the position of the selected coefficients.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
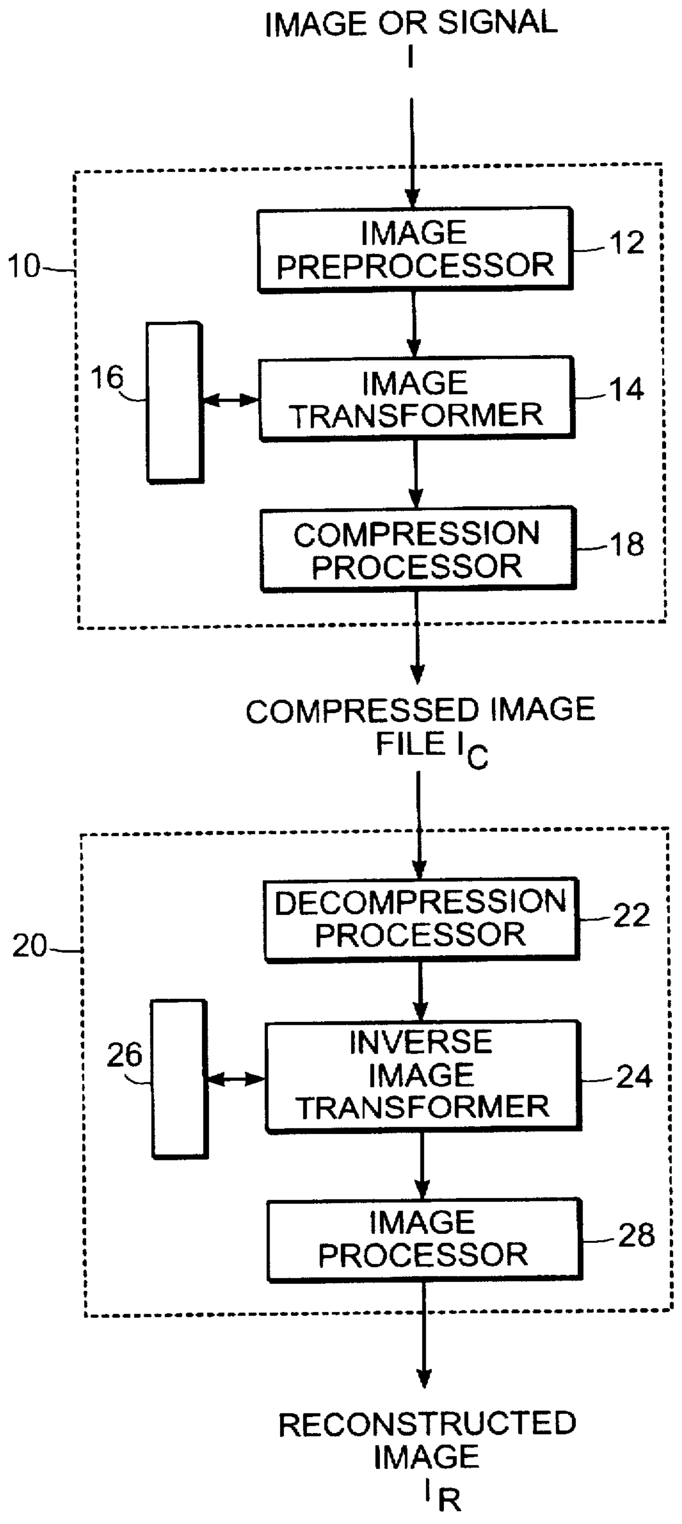
FIG. 1 is a block diagram illustrating image compression and image decompression systems in accordance with the present invention.

Referring now to FIG. 1, there is shown an image compression system 10 and an associated image reconstruction system 20 in accordance with the present invention. Image preprocessor 12 receives an input signal or image I and generates a digitized, formatted set of pixels appropriate for input to image transformer 14. The formatted set of pixels is passed to transformer 14 where it is transformed into a set of wavelet coefficients via a series of one-dimensional wavelet transforms. In generating wavelet coefficients, transformer 14 can obtain a desired wavelet transform from a wavelet library 16 containing a set of useful wavelet bases. Transformer 14 passes the set of wavelet coefficients to compression processor 18, which selects and compresses a subset of the wavelet coefficients thereby generating a compressed image file $I_c$ representation of the input I suitable for digital transmission or storage.

Reconstruction system 20 operates on the compressed image file $I_c$ to generate reconstructed image $I_R$. Compressed image file $I_c$ is received by decompression processor 22 where the subset of selected wavelet coefficients are restored from $I_c$. Inverse image transformer 24 performs an inverse transform operation, selecting the appropriate wavelet basis from wavelet library 26, on the restored set coefficients to generate a restored set of pixels from which image processor 28 can generate reconstructed image $I_R$.

Input signal I can comprise a data stream generated by one or more sensors, data from an imaging device, an image previously stored in a digital format or the like. In operation, image preprocessor 12 receives signal I and generates an image array comprising a two-dimensional M×N array of pixels $p_{m,n}$. For the purposes of this discussion, it will be assumed that a single image array with M=N=512 will be generated for each image and that each pixel $p_{m,n}$ is assigned a value between 0 and 255 representing the gray level of that pixel. Although it will be apparent to those skilled in the art that an image can be comprised of more than one component array and that the pixels can be distributed over any range. The procedure for generating an image array from input signal I is dependent upon the form of signal I and such procedures are well known in the art.

After generating the image array, preprocessor 12 reduces the image array by subtracting the mean of the image from the image. That is, each pixel $p_{m,n}$ is reduced as follows:

$$p_{m,n}=p_{m,n}-\bar{I} \qquad (1)$$

where $\bar{I}$ is the image mean and is given by:

$$\bar{I}=\sum_{m=1}^{M}\sum_{n=1}^{N}\frac{p_{m,n}}{(M)(N)}. \qquad (2)$$

The image mean is retained for incorporation in compressed image file $I_c$. The mean is restored to the image by reconstruction system 20. The image mean is subtracted from the image to reduce the size of the wavelet coefficients generated by transform processor 14.

The reduced image array, is passed to transform processor 14, where the reduced image array is transformed via a series of one-dimensional wavelet transforms. The transform processing is accomplished by first performing a one-dimensional transform on each row of the reduced image and replacing the pixels $p_{m,n}$ with the wavelet coefficients calculated. After all of the rows are transformed, a one-dimensional wavelet transform is performed on each of the columns, which now hold the coefficients from the row transforms. The result of the two one-dimensional transforms is a coefficient matrix which is the same size as the image matrix. That is, transformer 14 generates an M×N matrix of wavelet coefficients $c_{m,n}$, herein referred to as a coefficient matrix.

In generating wavelet coefficients, processor 14 is able to select a wavelet basis from wavelet library 16 and, if desired, processor 14 can select a different wavelet basis for each row and column transformed. Therefore, in addition to generating the wavelet coefficient matrix, transformer 14 also generates a list indicating the basis used with each row and column. Using only one row basis and one column basis will reduce the amount of information which must be included in image file $I_c$ since only the two bases used need to be stored. Furthermore, if one row basis and one column basis can be agreed upon apriori, then these bases can be stored in the library and need not be included in image file $I_c$, thereby further reducing the amount of data contained in $I_c$.

It may be advantageous in some applications to select a different basis to be used for each row or for sets of rows as well as for each column or set of columns. However, storing the bases for all M rows of the image would require as much storage as the image itself. An entire basis for a single row requires a number for each element in a row (N numbers are required for the transform for each row m). Therefore, in a preferred embodiment a set of L useful bases, each being uniquely identified such as by a number 1 through L, is created and maintained in wavelet library 16. Wavelet library 26 contains an identical set of bases. With this arrangement, the basis used to transform a row or column can be identified by its number, thereby requiring only M+N numbers to be stored.

The coefficient matrix and, if applicable, a basis list indicating the bases used to transform the rows and columns, are passed to compression processor 18 which generates compressed image file $I_c$. Due to the compression capabilities of the wavelet transform, the coefficient matrix should contain very few large coefficients with most of the coefficients $c_{m,n}$ being zero. By retaining only the largest coefficients, high compression is possible with very little loss of information or fidelity in the reconstructed image. Processor 18 generates image file $I_c$ by selecting a subset of the non-zero coefficients and storing the selected coefficients along with a location identifier that identifies the row address and the column address for each selected coefficient.

The criterion used in selecting coefficients for retention may be tailored to meet specific application requirements. In some applications image fidelity must be maintained, but the compression ratio is the primary concern. For example, a minimum image compression ratio may need to be maintained to keep pace with a real-time data acquisition rate or to satisfy the bandwidth limitations of a communications link used to transfer the images from an acquisition system to a remote platform for analysis. Conversely, in many applications a high compression ratio is needed, however image fidelity is the primary concern.

Similarly, in image recognition or classification applications, an image may be obtained in a remote location and transmitted to another location for processing, or the image may be saved in a digital format for processing at a later time. Thus, both compression ratio and image fidelity are of concern; however, the compressed image must maintain the features from the original image which are used for classification.

Several techniques can be used to evaluate and select coefficients for retention. One technique is to select the X largest coefficients where X is the number of coefficients allocated for the compressed image file $I_c$. By largest coefficients it is meant the coefficients of largest magnitude. Alternatively, processor 18 can select a subset of the nonzero coefficients based on regions of interest in the original image and/or the position of coefficients within the coefficient matrix. To illustrate this selection technique, the structure of the coefficient matrix and its use in identifying and evaluating coefficients to be included in $I_c$ will be described below.

Figure 2:
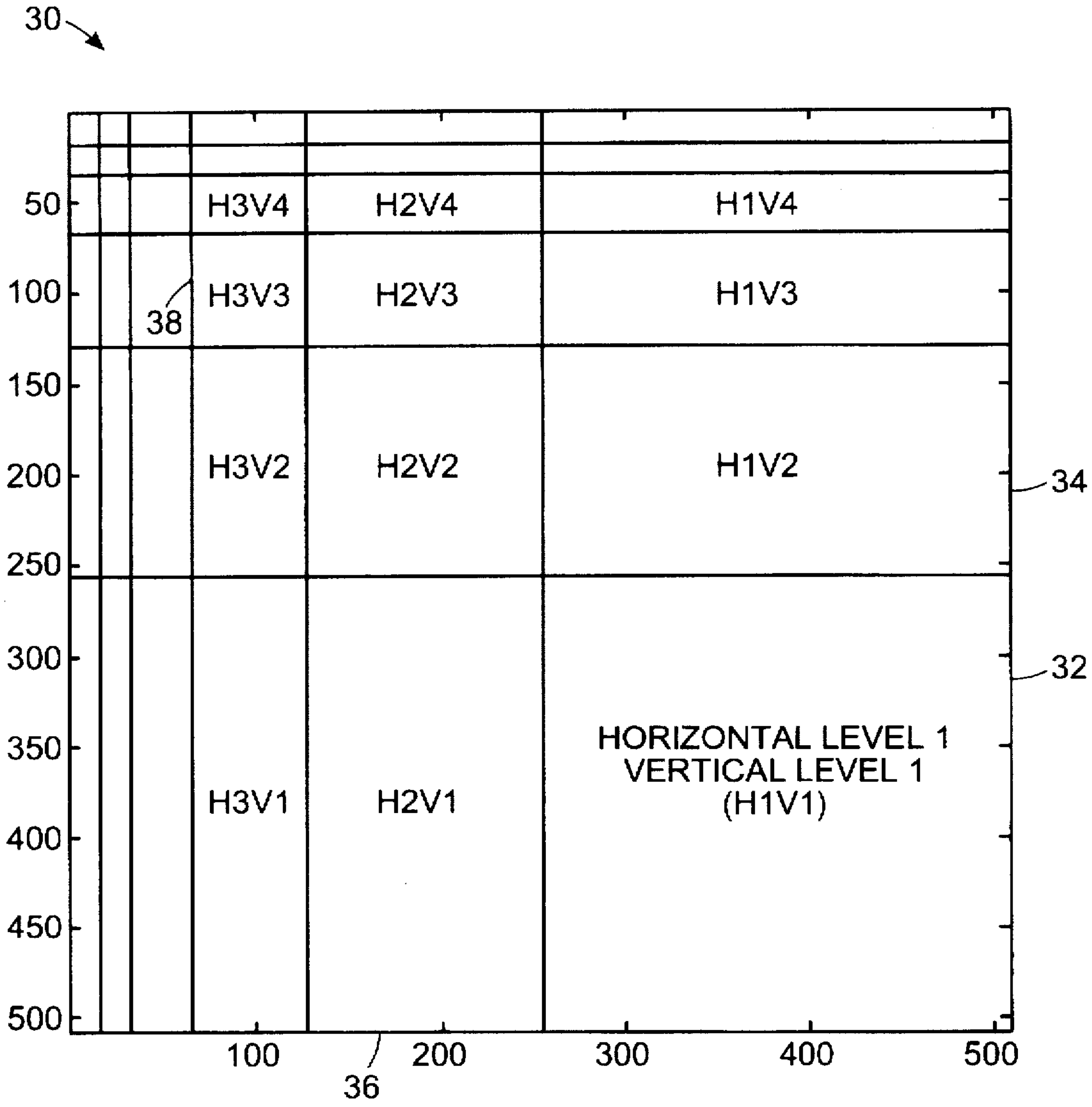
FIG. 2 is a diagram illustrating the structure of a coefficient matrix.

Referring now to FIG. 2, there is shown a diagram illustrating the structure of a coefficient matrix 30 as it relates to the location of the coefficients $c_{m,n}$. Matrix 30 is an exemplary coefficient matrix such as would be generated by transformer 14 using the Daubechies Fast Wavelet Transform (FWT). The horizontal and vertical correlation coefficients with the Daubechies Fast Wavelet Transform for each level are located in regions as shown in FIG. 2. The coefficients $c_{m,n}$ are organized by level, where level zero can be thought of as the original data. Level horizontal one (H1) is formed when the FWT is applied to a row; the correlation coefficients for the largest scale and, therefore, the finest resolution in position are stored in the right half of matrix 30. Levels H2 and higher are in the left half columns of matrix 30. Similarly, the column coefficients are computed from intermediate results of transforming the rows and are designated V1, V2, . . . , with level V1 stored in the lower half of matrix 30 and levels V2 and higher stored in the upper half.

A number of discrete regions within matrix 30 have been identified by a horizontal and vertical level number, e.g., H3V1, to illustrate the level structure within matrix 30. That is, region 32 of matrix 30 corresponds to horizontal level one and vertical level one (H1V1). Similarly, region 34 corresponds to level H1V2 and region 36 which corresponds to level H2V1. In signal processing terms, the lower levels, such as region 32 correspond to high resolution in time and a low resolution in frequency. The higher levels, such as region 38 (H3V3), correspond to a higher resolution in frequency with lower resolution in time.

Figure 3A:
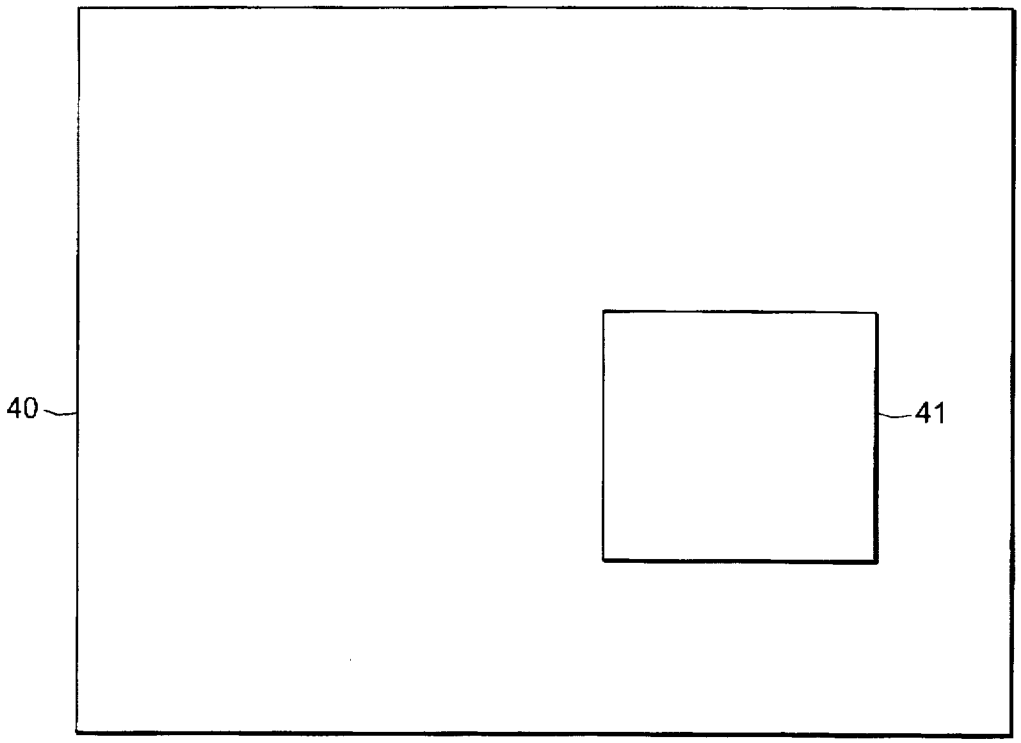
FIG. 3A is a diagram illustrating a region of interest within an image matrix.
Figure 3B:
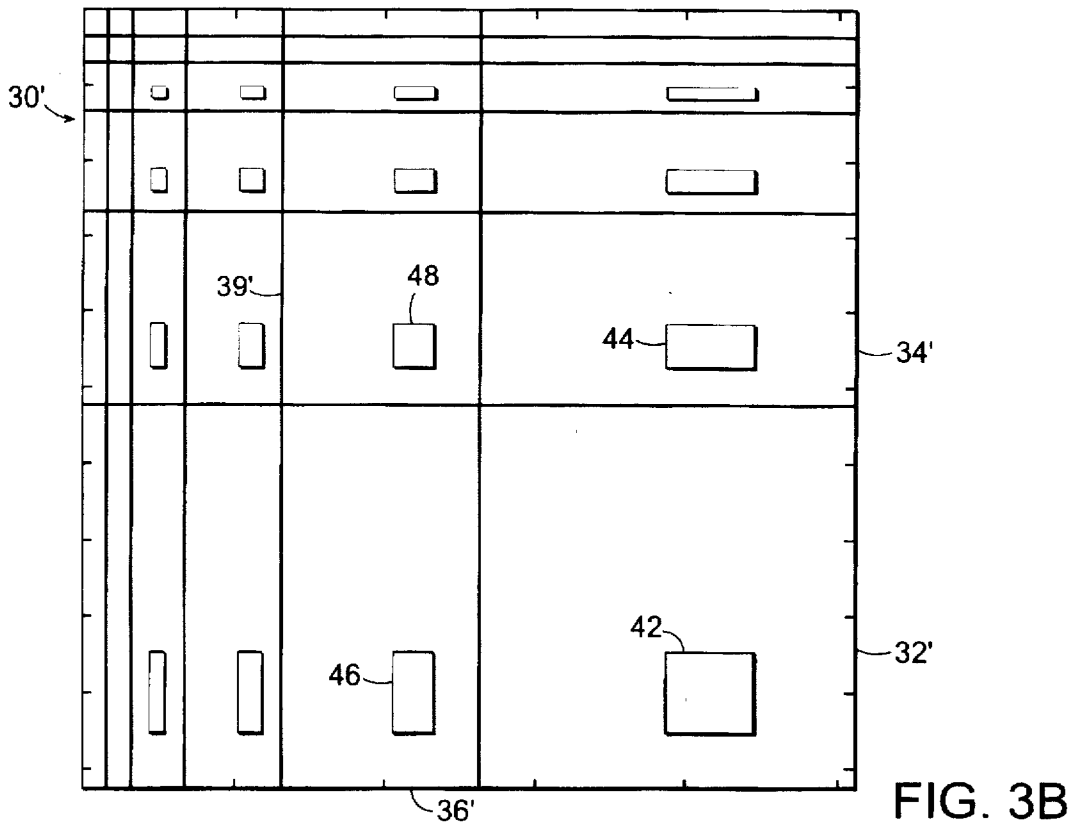
FIG. 3B shows the coefficient matrix for the region of interest of FIG. 3A.

Within each region or level, the coefficients are positioned relative to where the information exists in the original image. How the information is mapped into a coefficient matrix is shown in more detail in FIGS. 3A and 3B. FIG. 3A shows an image matrix 40 with a region of interest within the image identified as 41. FIG. 3B shows the coefficient matrix 30' generated by transformer 14 for region 41 of image matrix 40. As can be seen in FIG. 3B, coefficient matrix 30' can be divided into several discrete regions each of which can be identified by a unique level number. For example, region 32' corresponds to H1V1, region 34' corresponds to H1V2 and region 36' corresponds to H2V1. The non-zero wavelet coefficients for the region of interest 41 of image 40 fill square blocks on the diagonal, with block 42 within region 32' being four times larger than block 48 within region 39'. For regions of matrix 30' off the diagonal, blocks become rectangular since fewer coefficients are required for one of the dimensions as is illustrated with block 44 within region 34' and block 46 within region 36'. It should be noted that the relative position of the block containing the non-zero coefficients in each HV level is consistent with where the region of interest is located with respect to the overall original image.

The selection technique can use information regarding the HV level in which a coefficient resides as well as where within that level the coefficient is located to identify coefficients for retention. Selecting coefficients based on regions of interest in the original image and/or on the position (HV level) within the coefficient matrix that the coefficients reside can ensure that certain features of or areas in the original image will be maintained in the compressed image and restored in the reconstructed image.

Generally, the coefficients found in the higher levels will be larger than the coefficients residing in the lower levels. Thus, selecting the X largest coefficients (globally selecting the coefficients having the largest magnitude) will often result in most of the selected coefficients being from the higher HV levels. While such a technique can be used to obtain a high compression ratio and maintain image fidelity, it may eliminate some irregularities or discontinuities in the original image which are necessary for classification. To ensure the selection of coefficients from various levels processor 18 can use a selection function having a threshold that varies with the location of the coefficient within said coefficient matrix. That is, the threshold varies with the HV level. For example, processor 18 may use a local maximum selection function which for high HV levels select all coefficients which have a magnitude of at least sixty percent of the mean coefficient magnitude for that level. At lower HV levels the selection function would keep only those coefficients having a magnitude greater than 1.5 times the mean coefficient magnitude. The threshold value for each level can be determined statistically such that at higher levels a majority of the coefficients are kept while at lower levels only those coefficients having a magnitude which varies significantly from the mean are retained.

Alternatively, if a region of interest in the original image can be identified, this information can be used to ensure that fidelity is maintained in that area. For example, in many current medical applications one or more images are generated in one location and viewed by specialists for diagnosis in one or more remote locations. In such applications, the original images may be viewed before transmission allowing one or more regions of interest to be selected. In transmitting the images, an over all image fidelity can be maintained with a greater fidelity being maintained in the regions of interest.

If one or more regions of interest in the original image can be identified before compression, processor 18 may select coefficients based on a selection function that weights coefficients corresponding to region of interest in the original image higher than coefficients outside of that region. Processor 18 would then select the coefficients having a selection function output that exceeds a threshold value. This threshold value can vary with the region or level of the coefficient matrix. For example, coefficients which are positioned within the matrix relative to where the region of interest in the original image exists are weighted higher by multiplying their magnitude by a weighting factor which is greater than one. Processor then selects coefficients having a weighted magnitude which is greater than some threshold value which can vary with the region or level of the coefficient matrix. The threshold value can be equal to or based on the mean of the unweighted magnitudes of the coefficients within a region of interest or HV level.

Having selected the subset of coefficients from the coefficient matrix to be retained, processor 18 generates the compressed image file $I_c$. Image file $I_c$ contains three basic components: a header, coefficient location identifiers, and the coefficients themselves. The header contains basic information about the image, the processing performed by transformer 14. That is, the header contains the information needed to perform inverse transform processing including: the size of the original image (number of rows and columns), the mean value of the original image ($\bar{I}$), any multiplier used to scale the 8-bit or 16-bit coefficients selected, the number of coefficients selected, the bases used to transform the rows and columns, and the length of the wavelet filter used for the rows and for the columns.

The coefficient location identifiers indicate the position (row and column address) within the coefficient matrix of each selected coefficient. As should be apparent from the above discussion, the position of the coefficients within the coefficient matrix is very important. To identify the position within the matrix, a single address is found for each coefficient by forming one vector of coefficients from the matrix. The location of each coefficient can then be identified using a single vector address. To reduce the size of the addresses, a coefficient location identifier (CLI) is generated for each retained coefficient. The CLI identifies the vector address of a coefficient by storing the address as offsets from the start of a page.

Each CLI comprises one or more offset bytes having n-bits. The first n−1 bits indicate an offset value and the $n^{th}$ bit indicates whether the offset value is an address on the current page or a jump to a new page. Using an offset byte comprising 8 bits allows a maximum page length of 128, as only 7 bits are available to indicate an address on the current page with the eighth bit set for example, to zero to indicate the offset is on the current page or to one to indicate the offset is a jump to a new page.

For example, three coefficients, residing in the $54^{th}$, $98^{th}$, and $400^{th}$ positions of the coefficient vector, can be identified as follows. The location of the first coefficient requires a CLI with one offset byte having the eighth bit set to zero and bits 1–7 set to 54. To identify the location of the second coefficient also requires one offset byte as it is still on the first page. Bit 8 is again set to zero and bits 1–7 are set to 98. To identify the third coefficient requires a CLI having two offset bytes. The first byte, indicating a page jump, has the eighth bit set to one and bits 1–7 set to 3, thereby identifying a jump of three pages. The second byte, indicating an address on the third page, has bit 8 set to zero and bits 1–7 set to 16. The fourth page identifies positions 384 to 511. If the difference of vector address between two coefficients requires a jump of more than 127 pages, then two or more bytes indicating page jumps are followed by a byte indicating the address on the page are used as the CLI.

Figure 4:
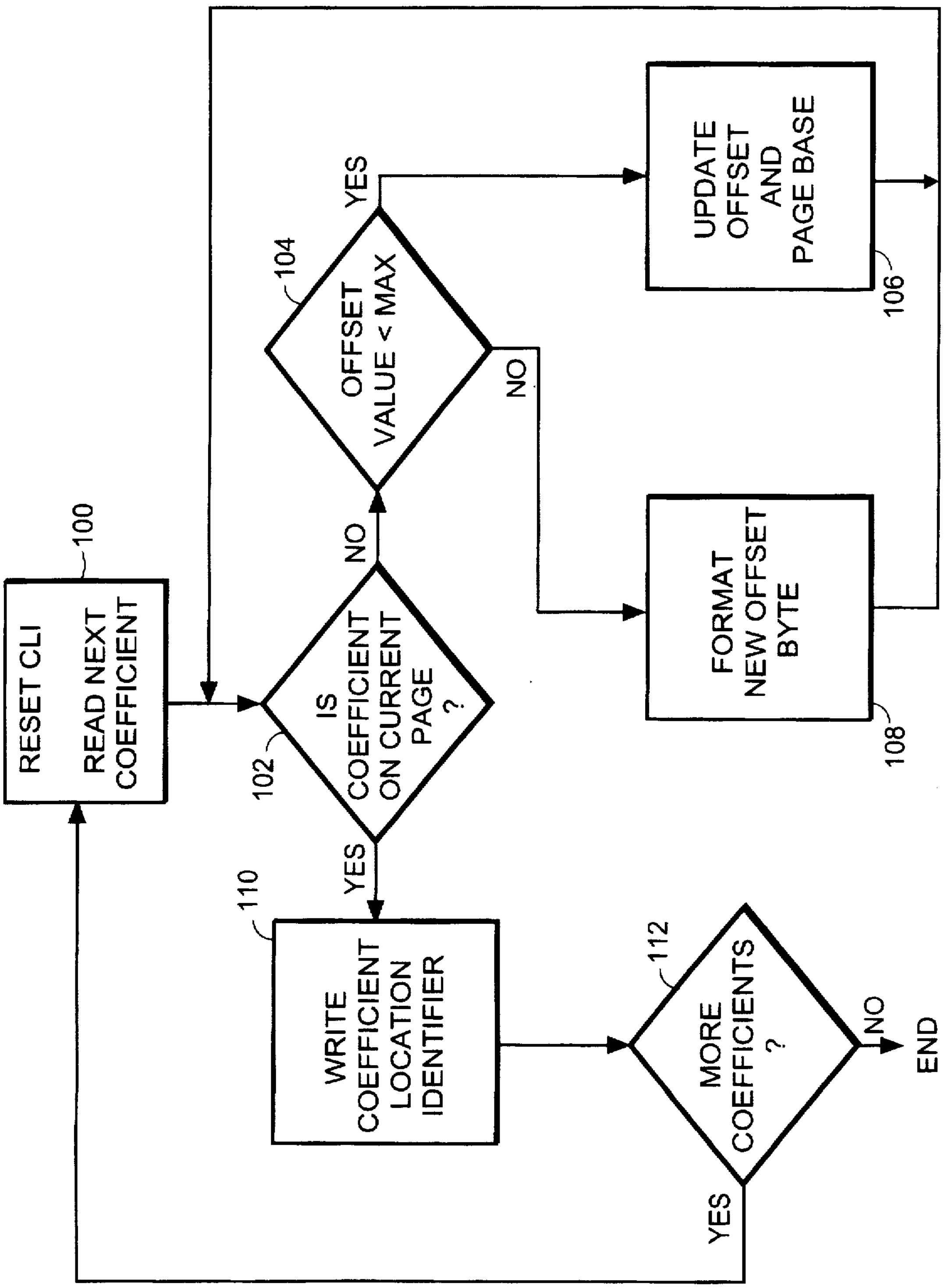
FIG. 4 is a flowchart diagram illustrating a process for generating a coefficient location identifier.

Referring now to FIG. 4, there is shown a flow chart of a process for generating coefficient location identifiers in accordance with the present invention. Step 100 resets the CLI to default to a page jump of zero pages (offset value equal to zero) and obtains the vector address of next coefficient to be saved.

Step 102 determines whether the vector address of the coefficient is on the current page, that is if the vector address is less than or equal to the current page base address plus the page length. If the vector address of the coefficient is not on the current page, step 104 determines if the maximum offset value has been reached. Assuming an 8-bit offset byte, step 104 determines if the offset value (bits 1–7) is less than 127. If the offset value is less than 127, step 106 increases the offset value, increases the current base page address to the base address of the next page and returns to step 102.

If the step 104 determines that the maximum offset value has been reached, step 108 formats and writes an offset byte which indicates a page jump with a maximum offset value to the compressed image file $I_c$. Step 108 also creates a new offset byte having a page jump of one page and returns to step 102.

If step 102 determines that the vector address of the coefficient is on the current page, then step 110 writes the CLI to the compressed image file $I_c$. If the current offset value is equal to zero (no page jumps) then step 110 determines the offset value for the location of the coefficient on the current page and writes this offset byte to $I_c$. If the offset value is greater than or equal to one (indicating a page jump), step 110 first writes the offset byte for the page jump and then writes the offset byte for the location of the coefficient on the current page. Step 110 can determine the offset value for the location of the coefficient by subtracting the current page base address from the vector address of the coefficient.

The process is repeated, beginning with step 102, for each coefficient selected until step 112 ascertains that a CLI has been generated for each selected coefficient.

The final component of compressed image file $I_c$ contains the selected coefficients. To reduce the size of $I_c$, the coefficients are scaled such that they can be represented using a predetermined number of bits. For example, the coefficients can be scaled to fit into 16 or 8 bit integers. To scale the coefficients, the magnitude of the largest coefficient is found. If the magnitude of the largest coefficient is between −128 and 127 (an 8 bit number), then all the coefficients are scaled up by a multiplier so that the largest coefficient is equal to 127 (or −128 if negative). The coefficients are then rounded to the nearest integer and stored as 8-bit integers. If the magnitude of the largest coefficient is between 127 and 32,767 (or between −128 and −32,768 if negative), the coefficients are rounded to the nearest integer and stored as 8-bit integers or 16-bit integers as necessary. If the magnitude of the largest coefficient greater than 32,767 (or smaller than −32,768), then all the coefficients are scaled down by a multiplier such that the largest coefficient is equal to 32,767 (or −32,768 if negative). The coefficients are then rounded to the nearest integer and stored as 8-bit or 16-bit integers as necessary.

In generating the compressed image file $I_c$, processor 18 first formats and builds the header. For each coefficient selected, processor 18 then generates and writes a CLI followed by the corresponding coefficient. The structure of a compressed image file is illustrated in Table 1.

TABLE 1

| Component | Item | Description |
|---|---|---|
| Header | Image Mean | Mean value of the original image ($\bar{I}$) |
| Header | Scaling Multiplier | Multiplier used to scale the wavelet coefficients |
| Header | Rows | Number of rows in the original image |
| Header | Columns | Number of columns in the original image |
| Header | Row Basis | Lists the bases used to transform the rows |
| Header | Column Basis | Lists the bases used to transform the columns |
| Header | Row Level | Contains level, if a level basis is used to transform the row |
| Header | Column Level | Contains level, if a level basis is used to transform the column |
| Header | Row Filter Length | Wavelet filter length used for the rows |
| Header | Column Filter Length | Wavelet filter length used for the columns |
| Header | Coefficients kept | The total number of coefficients selected for retention |
| Header | 8-bit coefficients kept | The number of 8-bit coefficients stored in the file |
| Header | 16-bit coefficients kept | The number of 16-bit coefficients stored in the file |
| Coefficient Location | Location identifier | Location identifier for the following 8-bit coefficient |
| Coefficient | 8-bit coefficient | 8-bit coefficient |
| Coefficient Location | Location identifier | Location address for the following 16-bit coefficient |
| Coefficient | 16-bit coefficient | 16-bit coefficient |

Reconstruction system 20 operates on the compressed image file $I_c$ generated by image compression system 10 to build a reconstructed image $I_R$. Decompression processor 22 receives the compressed image file, extracts the header information from the file, and builds a reconstructed coefficient matrix. Processor 22 places the selected coefficients in the reconstructed coefficient matrix using the CLI stored for each coefficient. Processor 22 then fills in the remaining positions in the matrix with zeros.

Inverse image transformer 24 reconstructs a restored image matrix from the reconstructed coefficient matrix via a series of inverse wavelet transforms. In generating the restored image matrix, transformer 24 is able to obtain representative wavelet bases from library 26 in accordance with know principals. The restored image matrix is passed to processor 28 which restores the image mean to each pixel and combines any component image matrices into a reconstructed image.

What has thus been described is an image compression system and an associated reconstruction system. These systems offer significant advantages over the prior art. The compression system obtains high compression ratios by substantially reducing the addressing information needed to identify the location of selected coefficients. Additionally, the compression system provides an efficient means for selecting coefficients.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for compressing an image comprising the steps of:

generating an image array comprising a two dimensional array of pixels, said two dimensional array having a plurality of rows and a plurality of columns;

generating a matrix of wavelet coefficients from said image array;

generating a list of selected coefficients by selecting a number of coefficients from said matrix of coefficients; and building a compressed image file comprising said selected coefficients, said step of building a compressed image file including generating a coefficient location identifier for each selected coefficient, wherein each coefficient location identifier indicates the position within the coefficient matrix of the selected coefficient.

2. The method of claim 1 wherein said matrix of wavelet coefficients is generated by performing a series of one-dimensional wavelet transforms.

3. The method of claim 2 further including the step of reducing said image array by subtracting the image mean from each pixel in said array of pixels.

4. The method of claim 2 wherein said step of generating a list of selected coefficients comprises selecting the coefficients of largest magnitude.

5. The method of claim 2 wherein said step of generating a list of selected coefficients comprises selecting coefficients having a magnitude greater than a threshold value.

6. The method of claim 5 wherein said threshold value varies with the location of a coefficient within said coefficient matrix.

7. The method of claim 2 wherein said step of generating a list of selected coefficients comprises:

weighting the magnitude of coefficients corresponding to a region of interest in the image array; and selecting the coefficients having a magnitude greater than a threshold value.

8. The method of claim 7 wherein said threshold value varies with the location of a coefficient within said coefficient matrix.

9. The method of claim 1 wherein said matrix of wavelet coefficients is generated by performing a one-dimensional wavelet transform on each one of said plurality of rows and performing a one-dimensional wavelet transform on each one of said plurality of columns.

10. The method of claim 9 wherein the same wavelet basis is used to transform each row of said two dimensional array of pixels.

11. The method of claim 9 wherein the same wavelet basis is used to transform each column of said two dimensional array of pixels.

12. The method of claim 9 further including the step of reducing said image array by subtracting the image mean from each pixel in said array of pixels.

13. The method of claim 1 wherein each coefficient location identifier identifies the position within the coefficient matrix as an offset from the start of a page and is comprised of at least one offset byte.

14. A system for compressing an image defined by an array of pixels having a plurality of rows and a plurality of columns comprising:

means for generating a matrix of wavelet coefficients from said image, said means for generating a matrix of wavelet coefficients performing a one-dimensional wavelet transform on each one of said plurality of rows and a one-dimensional wavelet transform on each one of said plurality of columns;

means for generating a list of selected coefficients from said matrix of coefficients, said means for generating a list of selected coefficients selecting coefficients having a magnitude greater than a threshold value, wherein said threshold value varies with the location of the coefficient within said coefficient matrix; and means for building a compressed image file from said list of selected coefficients, said means for building a compressed image file generating a coefficient location identifier for each selected coefficient, wherein each coefficient location identifier indicates the position within the coefficient matrix of each selected coefficient.

15. The system of claim 14 further including means for reducing said image array, said reducing means subtracting the image mean from each pixel in said array of pixels.

* * * * *